(12) United States Patent
Reuter (10) Patent No.: US 9,581,263 B2
(45) Date of Patent: Feb. 28, 2017

(54) PNEUMATIC VALVE AND VALVE UNIT

(71) Applicant: Marco Systemanalyse und Entwicklung GmbH, Dachau (DE)

(72) Inventor: Martin Reuter, Dachau (DE)

(73) Assignee: MARCO SYSTEMANALYSE UND ENTWICKLUNG GMBH, Dachau (DE)

( * ) Notice: Subject to any disclaimer, the term of this patent is extended or adjusted under 35 U.S.C. 154(b) by 0 days.

(21) Appl. No.: 14/611,833

(22) Filed: Feb. 2, 2015

(65) Prior Publication Data

US 2015/0226347 A1   Aug. 13, 2015

(30) Foreign Application Priority Data

Feb. 7, 2014  (DE) .................. 10 2014 101 542

(51) Int. Cl.
  *F16K 31/00* (2006.01)
  *F16K 11/20* (2006.01)
  *F15B 13/08* (2006.01)

(52) U.S. Cl.
  CPC ........ *F16K 31/007* (2013.01); *F15B 13/0832* (2013.01); *F16K 11/20* (2013.01); *F15B 2211/30575* (2013.01); *F15B 2211/6313* (2013.01)

(58) Field of Classification Search
  CPC .... F16K 31/007; F16K 11/20; F15B 13/0832; F15B 2211/6313; F15B 2211/30575
  See application file for complete search history.

(56) References Cited

U.S. PATENT DOCUMENTS

| | | | | |
|---|---|---|---|---|
| 4,158,847 | A * | 6/1979 | Heinzl | B41J 2/1429 347/40 |
| 4,493,137 | A * | 1/1985 | Bader | B06B 1/0655 29/25.35 |
| 4,617,952 | A * | 10/1986 | Fujiwara | F15B 5/003 137/596.17 |
| 5,381,817 | A * | 1/1995 | Gassman | F15B 5/003 137/82 |
| 6,427,723 | B2 * | 8/2002 | Bogdanowicz | F15B 13/0814 137/271 |

(Continued)

FOREIGN PATENT DOCUMENTS

DE  19547149 A1  6/1997
DE  102008057415 B3  6/2010

(Continued)

*Primary Examiner* — Craig Schneider
*Assistant Examiner* — Kevin Barss
(74) *Attorney, Agent, or Firm* — Cantor Colburn LLP (57) ABSTRACT

A pneumatic valve comprises a valve housing in which at least two passage channels are formed which are associated with respective pneumatic connections; a movable closing element for a selective closing and releasing of the passage channels; and a piezoelectric drive for the controlled movement of the closing element. The piezoelectric drive comprises two separately controllable individual drives as well as closing elements which are associated therewith and which are movable independently of one another, with each of the closing elements being provided for a selective closing and releasing of one of the passage channels.

12 Claims, 5 Drawing Sheets

(56) References Cited

U.S. PATENT DOCUMENTS

| | | | | |
|---|---|---|---|---|
| 6,715,400 | B2* | 4/2004 | Muth | F15B 11/006 137/269 |
| 6,851,764 | B2* | 2/2005 | Giers | B60T 8/36 303/115.2 |
| 7,849,870 | B2* | 12/2010 | DuPuis | F16K 31/004 137/14 |
| 2007/0045579 | A1* | 3/2007 | Wirtl | G05D 16/163 251/129.04 |
| 2009/0165876 | A1 | 7/2009 | Atkin et al. | |
| 2010/0326530 | A1* | 12/2010 | DuPuis | F16K 31/007 137/1 |
| 2014/0319968 | A1* | 10/2014 | Sashida | H01L 41/083 310/332 |
| 2014/0368088 | A1* | 12/2014 | Takahashi | H03H 9/21 310/348 |

FOREIGN PATENT DOCUMENTS

| | | |
|---|---|---|
| JP | H1014262 A | 1/1998 |
| KR | 1020050018357 A | 2/2005 |
| KR | 100698894 B1 | 3/2007 |

\* cited by examiner

PNEUMATIC VALVE AND VALVE UNIT

The present invention relates to a pneumatic valve having a valve housing in which at least two passage channels are formed which are associated with respective pneumatic connections, having a movable closing element for a selective closing and releasing of the passage channels and having a piezoelectric drive for the controlled movement of the closing element.

Pneumatic valves serve for the control of the compressed air flow in pneumatic systems. There is generally the endeavor to design the valve housing of pneumatic valves as slim as possible to be able to arrange a plurality of valves in a row next to one another in a simple manner. A piezoelectric drive complies with this demand for a slim construction.

Conventional pneumatic valves having a piezoelectric drive have an individual driven closing element which blocks one of the two passage channels depending on the switch position. This embodiment is inevitably associated with a specific regulation behavior, namely with that of a negative overlap. Such a valve cannot be used if a positive overlap or a zero overlap is desired.

It is an object of the invention to make a more flexible control possible with piezoelectrically operated pneumatic valves.

The object is satisfied by a pneumatic valve having the features of claim 1 as well as by a valve unit.

In accordance with the invention, the piezoelectric drive comprises two separately controllable individual drives as well as closing elements which are associated therewith and which are movable independently of one another, with each of the closing elements being provided for a selective closing and releasing of one of the passage channels. This opens up the possibility of influencing the time sequence between the opening of one of the passage channels and the closing of the other passage channel, or vice versa, between the closing of one of the passage channels and the opening of the other passage channel, as desired by a corresponding control of the individual drives. It is in particular possible due to the independent drives to selectively provide a specific type of overlap and to change it as required with one and the same pneumatic valve. A pneumatic valve in accordance with the invention thus has a flexibly adaptable regulation behavior.

In accordance with an embodiment of the invention, each of the individual drives comprises a piezoelectric stack having a plurality of layers of piezoelectric material arranged in a stacked manner and respectively provided with electrodes. A preferred embodiment in this respect provides that each stack has a piezoelectrically passive region in which no electrical field arises. The electrical contacts can be arranged in the piezoelectrically passive region to reduce their mechanical load. The two individual drives are preferably of identical design.

At least one of the piezoelectric stacks can be mechanically connected to a lever which is configured for converting a drive movement of the stack into an adjustment movement of a closing element provided at the lever, in particular a sealing plate fastened to the lever. Such arrangements are in particular characterized by a small space requirement. It is therefore preferred that all present piezoelectric stacks are mechanically connected to respective levers for converting a drive movement into an adjustment movement. The sealing plate can in this respect be adhesively bonded to the associated lever, preferably at a lever end. A particularly place-saving construction results if the at least one piezoelectric stack is configured for a tilting drive movement.

Each of the piezoelectric stacks can be clamped between a base and a counter base. The base and the counter base can in this respect be preloaded with respect to one another by means of one or more clamping elements such as clamping screws, clamping anchor arrangements or the like.

However, a respective arrangement of a support element extending in a clamping direction and a wedge movable transversely to the clamping direction is preferably provided for the clamping of the piezoelectric stack, with the support element being wedged by means of the wedge between the counter base or a component connected thereto and a wall section of the valve housing. The support element can in particular be an elongate plate or a bar extending substantially in parallel with a lever as described above. On the assembly of the pneumatic valve, the wedge can be pressed in with a defined force between the support element and the wall to give the piezoelectric stack a preload. It has been found that a more exact setting of the preloading force is possible in this manner than e.g. by tightening a clamping screw.

A lubricant, in particular a hardenable resin such as epoxy resin, can be applied to the wedge. This facilitates the pressing in of the wedge on the assembly. If a hardenable resin is used, it can also provide a reliable fixing of the wedge at the predefined position after a sufficient hardening.

A further embodiment of the invention provides that each of the individual drives is cast into the valve housing by means of an elastic material. In particular the air volume located in the valve housing can hereby be reduced and thus a faster switching behavior of the pneumatic valve can be made possible.

The individual drives can be arranged next to one another, in particular in a common end region of the valve housing. Optionally present levers can extend in parallel with one another through the total valve housing with such an arrangement so that a particularly space-saving construction results.

Alternatively, the individual drives can be arranged disposed opposite one another, in particular in opposite end regions of the valve housing. The individual drives can therefore face one another with respect to the operative direction, with optionally present levers being arranged behind one another instead of in parallel with one another with respect to their lever axis. This embodiment therefore allows a particularly slim housing shape.

A further embodiment of the invention provides that three passage channels are formed in the valve housing which are associated with an inflow connection, an outflow connection and a work line connection, with the individual drives being associated with the inflow connection and the outflow connection. Such a 3/2 way valve provides the possibility of venting.

Provision can be made that the individual drives, including the respective associated closing elements and the respective associated passage channels, are arranged in mutually separate chambers of the valve housing. In this embodiment, the volume of the work line connection can be kept particularly small, which facilitates a fast switching behavior of the valve.

At least one of the passage channels can have an elongate cross-sectional shape. It could in particular be configured in the manner of a slit nozzle. The combination of a large periphery and a small area is favorable in this respect.

The invention also relates to a valve unit having a pneumatic valve as described above.

In accordance with the invention, a blocking valve is in fluid communication with one of the passage channels of the valve housing, in particular with a passage channel associated with an inflow connection. Such an upstream connection of a blocking valve is advantageous because the piezoelectric individual drives remain in a non-closing middle position on the lack of an electrical activation.

A valve unit in accordance with the invention can comprise, alternatively or additionally to the blocking valve, a pressure sensor for detecting a starting pressure of the pneumatic valve. A control device of the valve unit can use the detected starting pressure for regulation purposes.

An electronic control device of the valve unit can in particular be in communication connection with the pressure sensor and can be configured for controlling the individual drives of the pneumatic valve on the basis of a pressure signal of the pressure sensor. The control device can thus exactly regulate the starting pressure. The control device can include a control computer or can be configured as a control computer which can easily be integrated into a higher ranking control system. The control computer can receive control commands from the higher ranking control system and can convert them into corresponding voltage signals to activate the piezoelectric individual drives.

The control device can be configured to set an overlap of the pneumatic valve by controlling the individual drives, with the control device, preferably, being configured to set a positive overlap, a negative overlap or a zero overlap of the pneumatic valve in dependence on a received control command. It is thus possible to set the overlap and thus the regulation behavior of a pneumatic valve by software and to change it accordingly as required.

Further embodiments of the invention are also recited in the dependent claims, in the description and in the drawing.

The invention will be described in the following by way of example with reference to the drawings.

Figure 1A:
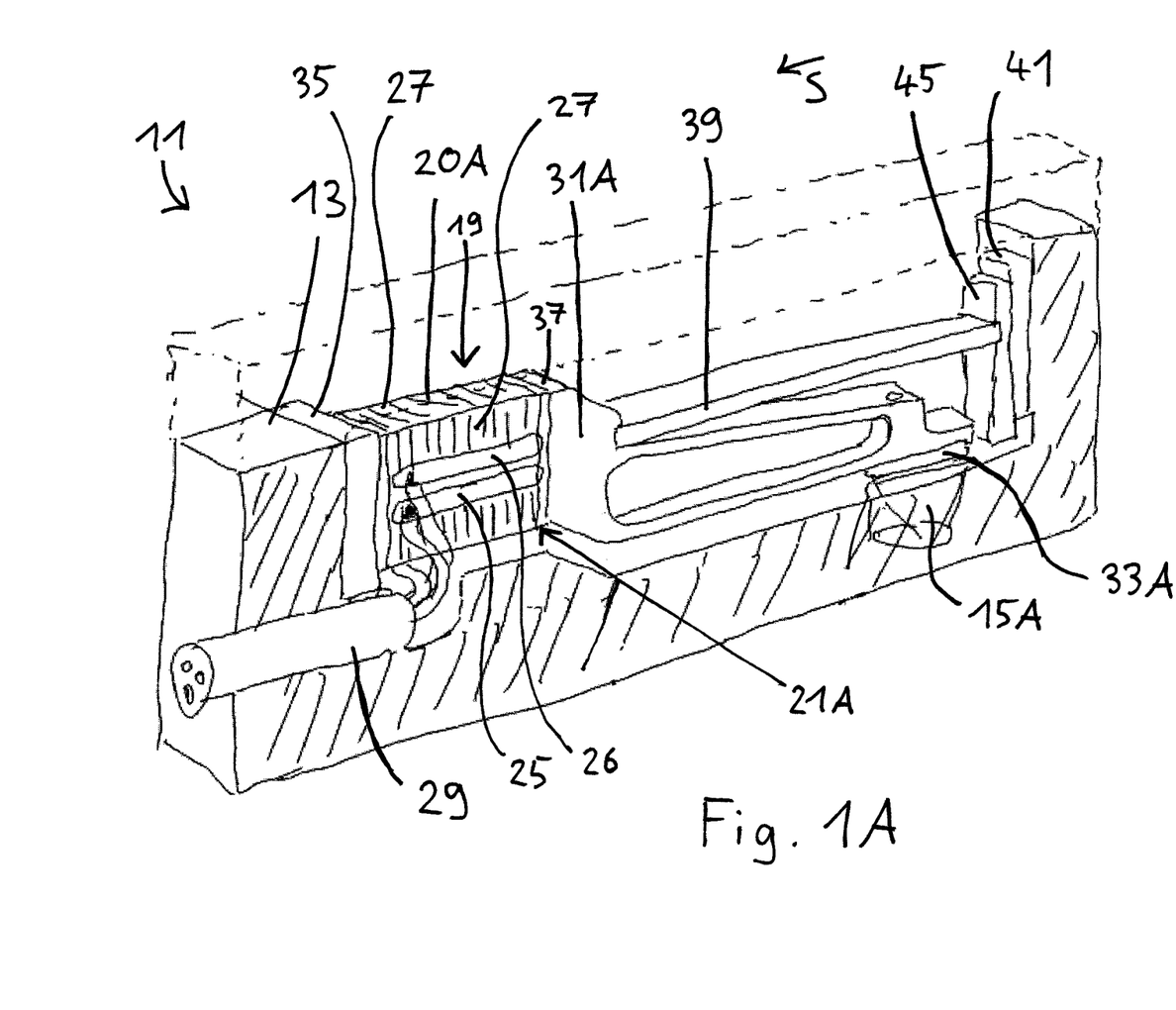
FIGS. 1A and 1B show a first embodiment of a pneumatic valve in accordance with the invention in an broken away perspective view and in a plan view.
Figure 1B:
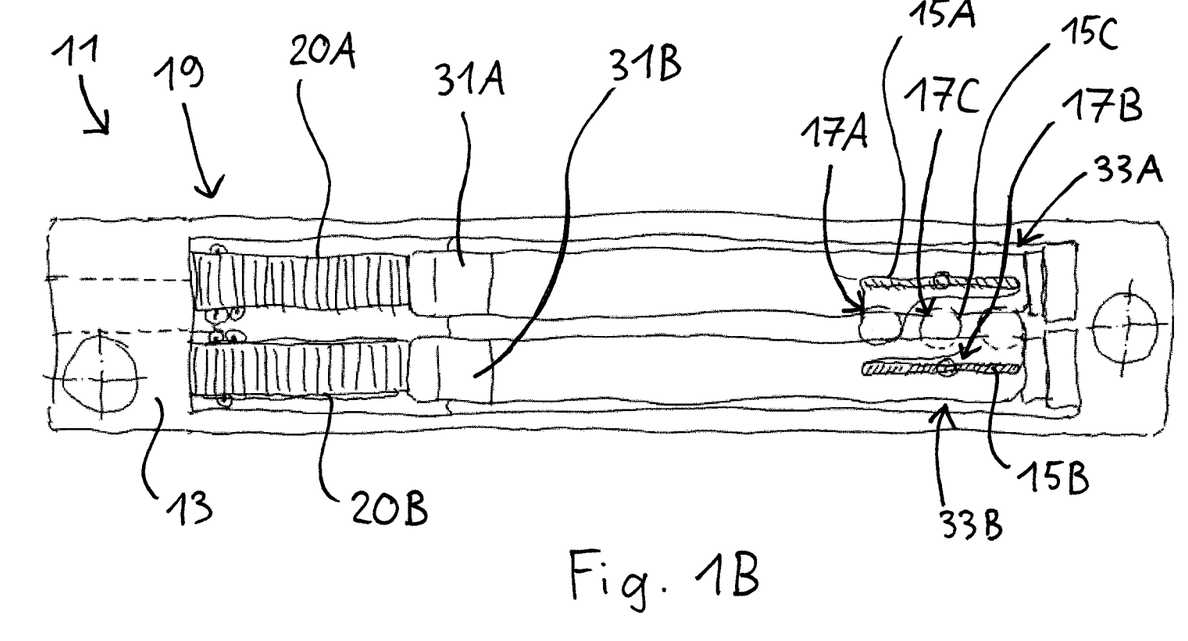

FIGS. 1A and 1B show a pneumatic valve 11 which is designed in accordance with a first embodiment of the invention and which comprises a valve housing 13 only shown in part. Three passage channels 15A, 15B, 15C are configured in the valve housing 13, with a first passage channel 15A being associated with a pneumatic inflow connection 17A, second passage channel 15B being associated with a pneumatic outflow connection 17B and a third passage channel 15C being associated with a pneumatic work line connection 17C. As can be recognized in FIG. 1B, the first passage channel 15A and the second passage channel 15B each have an elongate cross-sectional shape.

A piezoelectric drive 19 which comprises two separately controllable individual drives 20A, 20B is furthermore accommodated in the valve housing 13. Only one of the individual drives 20A is visible in the broken away representation in accordance with FIG. 1A. The two individual drives 20A, 20B each comprise a piezoelectric stack 21A, 21B having a plurality of layers 27 of piezoelectric material arranged in a stacked manner and respectively provided with electrodes 25, 26. The stacks 21A, 21B furthermore each have a piezoelectrically passive region which extends along the electrodes 25, 26 and in which no electrical field arises.

The control of the piezoelectric stacks 21A, 21B takes place via an electrical connection cable 29 which is led through the wall of the valve housing 13.

The piezoelectric stacks 21A, 21B are configured for a tilting drive movement which is transmitted to respective levers 31A, 31B. Respective closing elements 33A, 33B in the form of sealing plates are fastened, for example adhesively bonded, to the end of the levers 31A, 31B remote from the stack end and extending in parallel. If the first lever 31A is located in a lower tilt position, the first passage channel 15A is closed in a fluid-tight manner. Conversely, the first passage channel 15A is open when the first lever 31A is located in an upper tilt position. The same applies to the cooperation between the second lever 31B and the second passage channel 15B. The inflow and the outflow of the pneumatic valve 11 can thus be controlled independently of one another by a tilt movement of the piezoelectric stacks 21A, 21B.

The piezoelectric stacks 21A, 21B are each clamped between a base 35 (FIG. 1A) and a counter base 37 attached to the associated lever 31A, 31B or formed by a part thereof.

An arrangement of an elongate support element 39 extending in the clamping direction S and of a wedge 41 movable transversely to the clamping direction S serves in each case to press the respective lever 31A, 31B toward the piezoelectric stack 21A, 21B. An abutment element 45 is arranged between the wedge 41 contacting the wall of the valve housing 13 and the associated support element 39. In the assembly of the pneumatic valve 11, the wedge 41 is pressed in transversely to the clamping direction S with a defined force in order thus to provide a desired preload of the respective piezoelectric valve 21A, 21B. The wedges 41 can be fixed in their installation positions by means of a hardened resin.

In the embodiment shown in FIG. 1, the individual drives 20A, 20B are arranged next to one another in a common end region of the valve housing 13. In contrast to this, in the pneumatic valve 11' shown in FIG. 2 and designed in accordance with an alternative embodiment, the individual drives 20A, 20B are arranged disposed opposite one another in opposite end regions of the valve housing 13. The piezoelectric drive 19 is connected to that space of the valve housing 13 which is associated with the pneumatic work line connection 17C. This is of advantage to the extent that no dividing wall is required between the individual drives 20A, 20B. It can be seen from FIG. 2 that the individual drives 20A, 20B are cast into the valve housing 13 by means of an elastic material 47.

Figure 2:
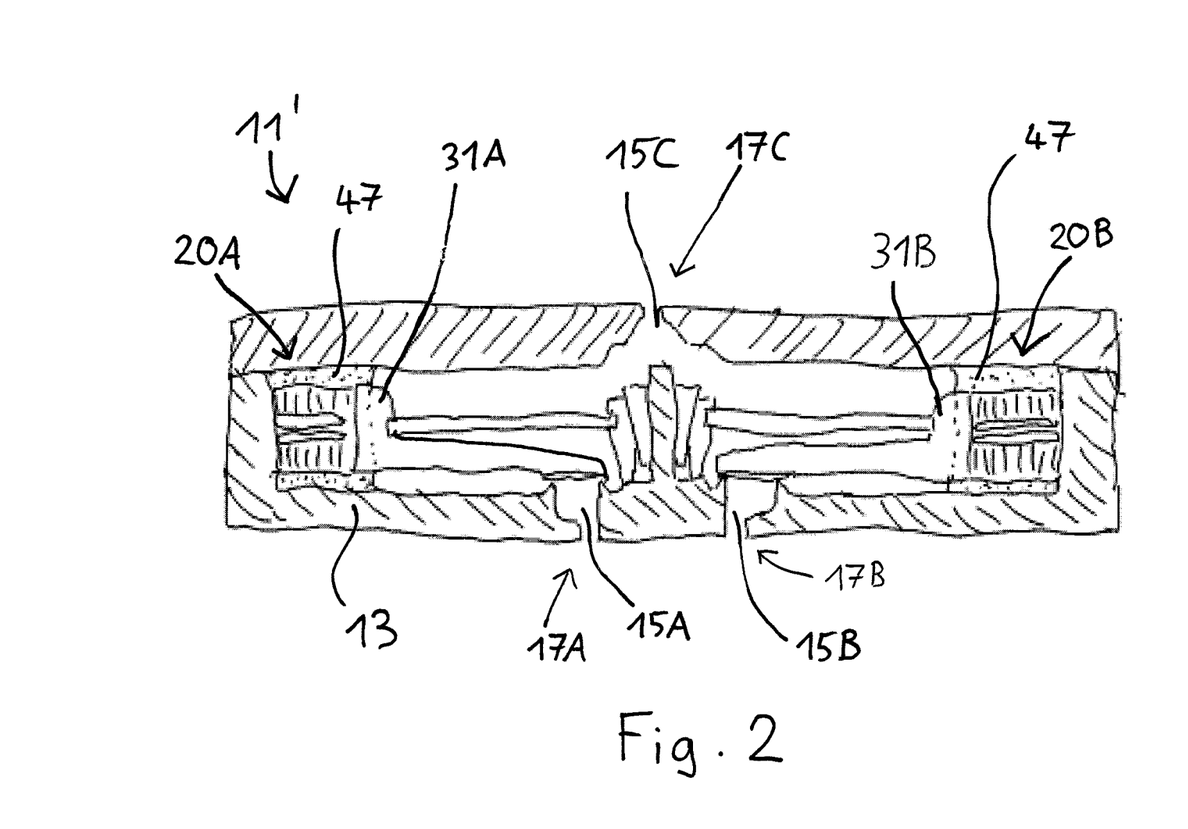
FIG. 2 shows a second embodiment of a pneumatic valve in accordance with the invention in a lateral sectional view.
Figure 3:
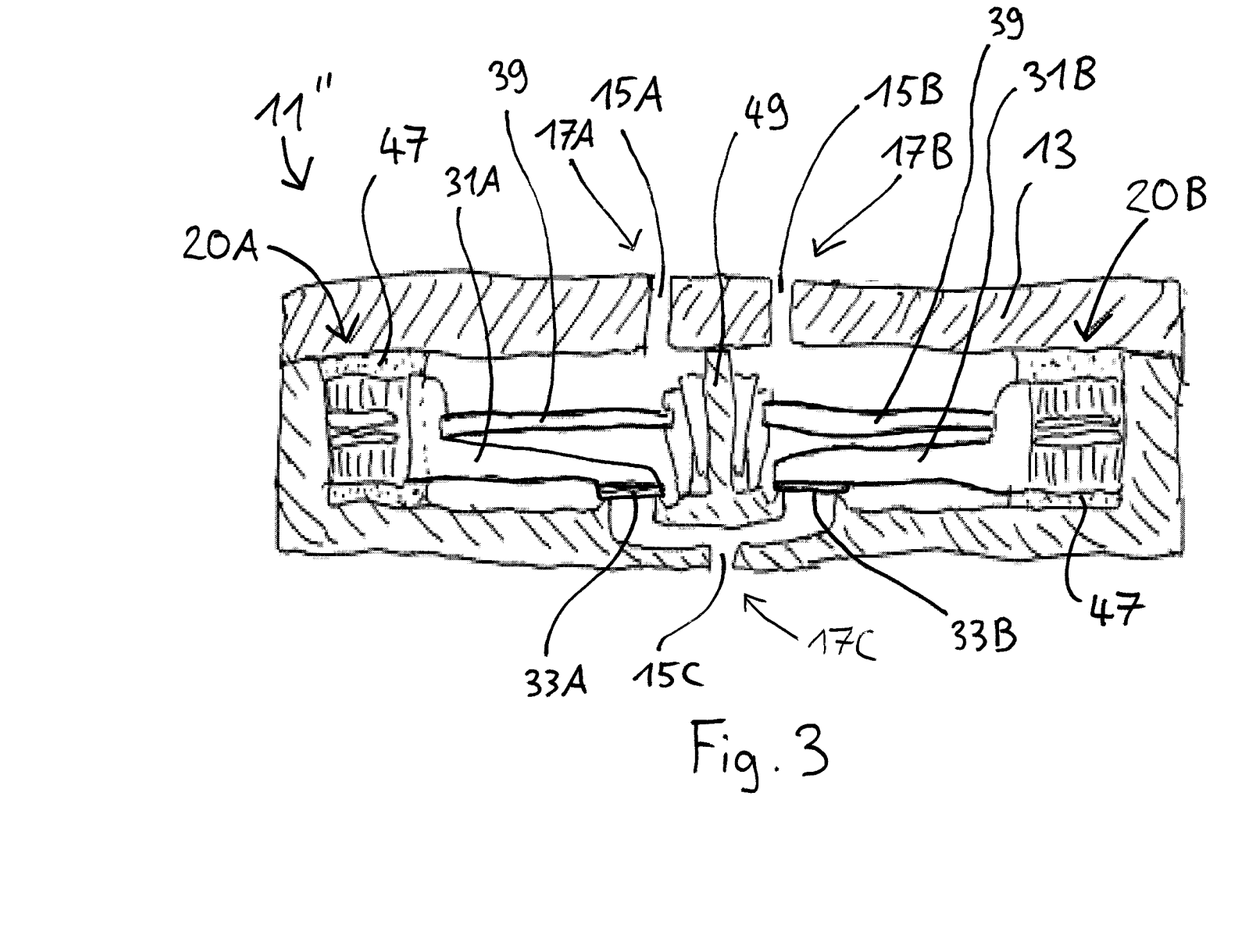
FIG. 3 shows a third embodiment of a pneumatic valve in accordance with the invention in a lateral sectional view.

In the further embodiment of a pneumatic valve 11" which is shown in FIG. 3 and which has a similar design to the pneumatic valve 11' shown in FIG. 2, the individual drives 20A, 20B, including the respective associated levers 31A, 31B and closing elements 33A, 3B, are arranged in mutually separate chambers of the valve housing 13. A dividing wall 49 is provided in the valve housing 13 for this purpose. The pneumatic valve 11" shown in FIG. 3 is suitable for a particularly fast switching since both closing elements 33A, 33B are associated with the third passage channel 15C and the volume connected to the work line connection 17C is thus particularly small. If required, a slow switching can, however, be effected by a corresponding control of the individual drives 20A, 20B.

Figure 4:
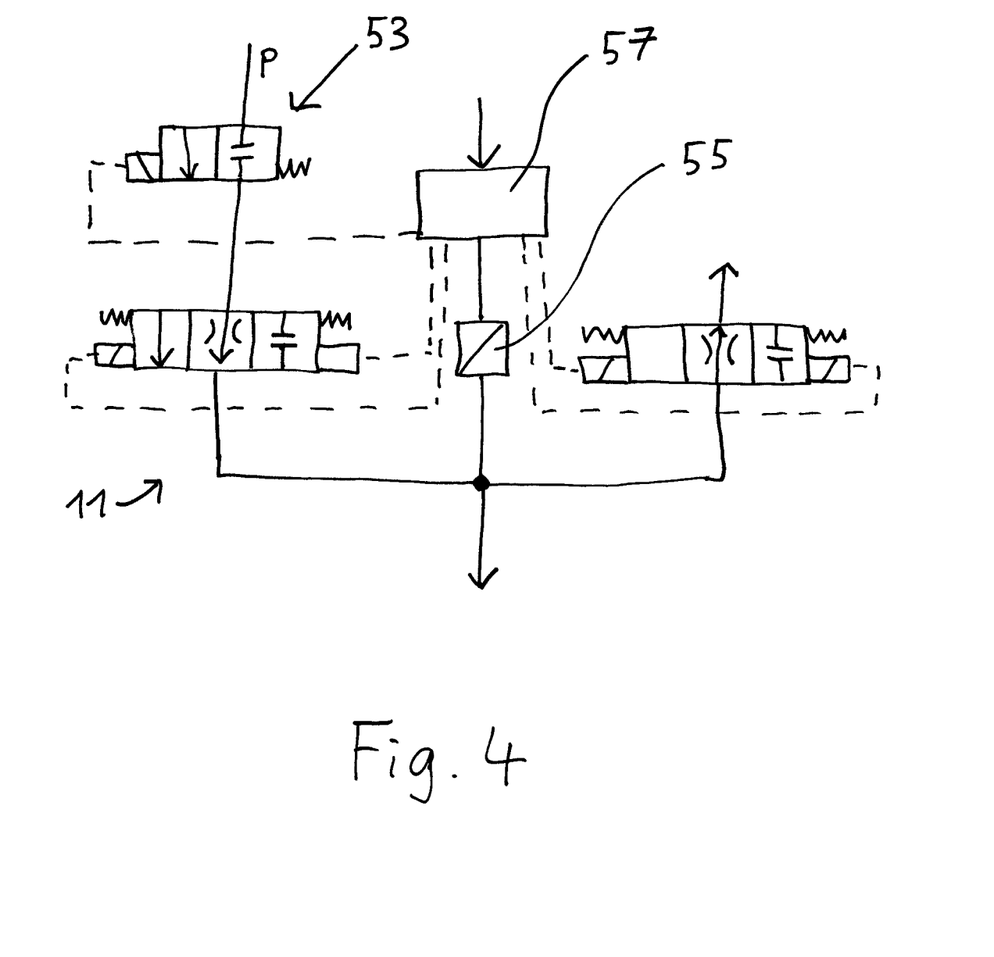
FIG. 4 shows a circuit diagram of a valve unit in accordance with the invention.

FIG. 4 shows a valve unit 50 in accordance with the invention having a pneumatic vale 11 as described above and an upstream blocking valve 53. A pressure sensor 55 is furthermore provided for detecting the starting pressure of the pneumatic valve 11. An electronic control device 57 regulates the operation of the pneumatic valve 11 with reference to a pressure signal received by the pressure sensor 55. The control device 57 is able to set an overlap of the pneumatic valve 11 on the basis of the separately controllable individual drives 20A, 20B. It is in particular possible for a user to select by software whether the pneumatic valve 11 should have the regulation behavior of a positive overlap, of a negative overlap or of a zero overlap.

REFERENCE NUMERAL LIST 11, 11', 11" pneumatic valve
13 valve housing
15A first passage channel
15B second passage channel
15C third passage channel
17A inflow connection
17B outflow connection
17C work line connection
19 piezoelectric drive
20A, 20B individual drive
21A, 21B piezoelectric stack
25 electrode
27 layer
29 electrical connection cable
31A, 31B lever
33A, 33B closing element
35 base
37 counter base
39 support element
41 wedge
45 abutment element
47 elastic material
49 dividing wall
50 valve unit
53 blocking valve
55 pressure sensor
57 electronic control device
S clamping direction

What is claimed is:

1. A pneumatic valve comprising:
a valve housing in which at least two passage channels are formed which are associated with respective pneumatic connections;
a movable closing element for a selective closing and releasing of the passage channels; and
a piezoelectric drive for a controlled movement of the closing element,
the piezoelectric drive comprising two separately controllable individual drives and closing elements which are associated therewith and which are movable independently of one another, with each of the closing elements being provided for the selective closing and releasing of one of the passage channels,
each of the individual drives comprising a piezoelectric stack having a plurality of layers of piezoelectric material arranged in a stacked manner and respectively provided with electrodes,
each stack having a piezoelectrically passive region in which no electrical field arises, the piezoelectrically passive region extending transversely relative to the plurality of layers of the piezoelectric stack.

2. The pneumatic valve in accordance with claim 1, wherein each of the individual drives is cast into the valve housing by means of an elastic material.

3. The pneumatic valve in accordance with claim 1, wherein the individual drives are arranged next to one another.

4. The pneumatic valve in accordance with claim 3, wherein the individual drives are arranged next to one another in a common end region of the valve housing.

5. The pneumatic valve in accordance with claim 1, wherein the individual drives are arranged disposed opposite one another.

6. The pneumatic valve in accordance with claim 5, wherein the individual drives are arranged disposed opposite one another in opposite end regions of the valve housing.

7. The pneumatic valve in accordance with claim 1, wherein the individual drives, including the respective associated closing elements and the respective associated passage channels, are arranged in mutually separate chambers of the valve housing.

8. The pneumatic valve in accordance with claim 1, wherein at least one of the passage channels has an elongate cross-sectional shape.

9. A pneumatic valve comprising:
a valve housing in which at least two passage channels are formed which are associated with respective pneumatic connections;
a movable closing element for a selective closing and releasing of the passage channels; and
a piezoelectric drive for a controlled movement of the closing element,
the piezoelectric drive comprising two separately controllable individual drives and closing elements which are associated therewith and which are movable independently of one another, with each of the closing elements being provided for the selective closing and releasing of one of the passage channels,
each of the individual drives comprising a piezoelectric stack having a plurality of layers of piezoelectric material arranged in a stacked manner and respectively provided with electrodes,
at least one of the piezoelectric stacks mechanically connected to a lever which is configured for converting a drive movement of the stack into an adjustment movement of a closing element provided at the lever.

10. The pneumatic valve in accordance with claim 9, wherein the closing element is a sealing plate fastened to the lever.

11. A pneumatic valve comprising:
a valve housing in which at least two passage channels are formed which are associated with respective pneumatic connections;
a movable closing element for a selective closing and releasing of the passage channels;
a piezoelectric drive for a controlled movement of the closing element,
the piezoelectric drive comprising two separately controllable individual drives and closing elements which are associated therewith and which are movable independently of one another, with each of the closing elements being provided for the selective closing and releasing of one of the passage channels,
each of the individual drives comprising a piezoelectric stack having a plurality of layers of piezoelectric material arranged in a stacked manner and respectively provided with electrodes,
each of the piezoelectric stacks clamped between a base and a counter base, and a respective arrangement of a support element extending in a clamping direction and a wedge movable transversely to the clamping direction provided for clamping the piezoelectric stack, with the support element being wedged by means of the wedge between the counter base or a component connected thereto and a wall section of the valve housing.

12. The pneumatic valve in accordance with claim 11, wherein a lubricant is applied to the wedge.

* * * * *